United States Patent
Nagy et al.

(10) Patent No.: US 9,829,329 B2
(45) Date of Patent: Nov. 28, 2017

(54) METHOD FOR MONITORING AND NAVIGATING A VEHICLE WITH ELECTRIC DRIVE MOVING TOWARDS A PREDETERMINED TARGET ALONG A NAVIGATED ROUTE

(71) Applicant: GPS TUNER KFT, Budapest (HU)

(72) Inventors: Tamas Nagy, Debrecen (HU); Gabor Tarnok, Budakalasz (HU)

(73) Assignee: GPS TUNER KFT., Budapest (HU)

( * ) Notice: Subject to any disclaimer, the term of this patent is extended or adjusted under 35 U.S.C. 154(b) by 0 days.

(21) Appl. No.: 14/914,630

(22) PCT Filed: Aug. 7, 2014

(86) PCT No.: PCT/HU2014/000064
§ 371 (c)(1),
(2) Date: Feb. 25, 2016

(87) PCT Pub. No.: WO2015/022555
PCT Pub. Date: Feb. 19, 2015

(65) Prior Publication Data
US 2016/0209226 A1    Jul. 21, 2016

(30) Foreign Application Priority Data
Aug. 15, 2013 (HU) .................................. 1300488

(51) Int. Cl.
*G01C 21/34* (2006.01)
(52) U.S. Cl.
CPC .............................. *G01C 21/3469* (2013.01)
(58) Field of Classification Search
CPC combination set(s) only.
See application file for complete search history.

(56) References Cited

U.S. PATENT DOCUMENTS

| 2011/0112710 A1* | 5/2011 | Meyer-Ebeling ... B60L 11/1861 701/22 |
| 2011/0254673 A1* | 10/2011 | Jean ......................... B62M 6/45 340/432 |

(Continued)

FOREIGN PATENT DOCUMENTS

EP    2378250 A2    10/2011

OTHER PUBLICATIONS

International Search Report issued in International application No. PCT/HU2014/000064, dated Jan. 19, 2015.

*Primary Examiner* — Edward J Pipala
(74) *Attorney, Agent, or Firm* — Handal & Morofsky LLC

(57) ABSTRACT

A method for monitoring and navigating a vehicle with electric drive towards a target with an off-line navigation device, in which a table is prepared and stored with data related to the vehicle when moving with a predetermined speed and under a predetermined load; storing in the memory the consumption of the vehicle when it takes a unity distance along a horizontal road with the predetermined speed; then storing corrected consumption values as a function of positive or negative angles of inclination of a road section of unity length that represents the ratio of experimentally determined consumption values of the vehicle at any given angle of inclination to the consumption along the horizontal road of unity length; storing map data also including the altitude and/or steepness information; then after the start of the vehicle monitoring in given time intervals the momentary storage capacity of the battery of the vehicle; dividing the remaining route leading to the target into a plurality of road sections so that each road section has a respective uniform angle of inclination, and in case of each of said sections and based on the stored data the respective weighted costs associated with the section is (Continued)

calculated; the weighted costs are summarized to the remaining length of the route whereby the expected consumption of the vehicle till reaching the target is determined, and comparing the expected consumption with the measured available capacity of the battery, and if the expected consumption is higher than the available capacity of the battery, warning the driver of the vehicle.

3 Claims, 2 Drawing Sheets

(56) References Cited

U.S. PATENT DOCUMENTS

| | | | |
|---|---|---|---|
| 2012/0053772 A1* | 3/2012 | Lu | B60L 15/2045 |
| | | | 701/22 |
| 2012/0158229 A1 | 6/2012 | Schaefer | |
| 2012/0179362 A1 | 7/2012 | Stille | |
| 2012/0232783 A1 | 9/2012 | Calkins | |
| 2014/0095003 A1* | 4/2014 | Phillips | B60L 11/123 |
| | | | 701/22 |

* cited by examiner

METHOD FOR MONITORING AND NAVIGATING A VEHICLE WITH ELECTRIC DRIVE MOVING TOWARDS A PREDETERMINED TARGET ALONG A NAVIGATED ROUTE

TECHNICAL FIELD

The invention relates to a method for monitoring and navigating a vehicle with electric drive moving towards a predetermined target along a navigated route with an off-line navigation device.

CROSS REFERENCE TO RELATED APPLICATIONS

This application is the National Stage Entry of International Application No. PCT/HU2014/000064, filed Aug. 7, 2014.

STATEMENT REGARDING FEDERALLY SPONSORED RESEARCH OR DEVELOPMENT (Not applicable)

BACKGROUND OF THE INVENTION

From the point of view of the method the term electrically driven vehicle includes vehicles driven only in part by an electric drive, and typically such vehicles are bicycles equipped with an electric drive, and in the majority of such bicycles the rider can adjust the proportion of the human and electric powers.

The planning of optimized navigation route is especially important for electrically driven vehicles, because the operating distance that can be travelled with such vehicles is significantly shorter compared to vehicles driven by conventional fuels. Furthermore, recharging of such vehicles is also difficult because both along roads designed for normal traffic and those designed only for bicycles there are few charging station and their geographic distribution is irregular.

There are methods known for planning routes for electrically driven vehicles which take more or less into consideration the capacity of the battery and the energy required for taking the route. Such a method is described e.g. in U.S. Pat. No. 8,332,151 that uses a map database with altitude data and determined the steepness of respective sections of the planned route and calculates the expected consumption of the vehicle by summarizing the consumption of the respective road sections. That system requires the use of a separate remote server machine, and estimates with a given accuracy that when the vehicle starting with a fully charged battery has sufficient energy to take the route.

The publication JP 2011112479A deals primarily with bicycle applications and it suggests a route planning solution which takes also into account that certain driving systems are equipped with energy regeneration properties, i.e. when they are moving downward along a slope the generated energy charges the battery increasing thereby the energy stored therein. This method calculates the expected consumption based on the upward or downward steepness of the route and compares it with the capacity measured or known at the beginning of the route and plans a route along which the expected consumption will be smaller than the available capacity. The publication is silent about the details on what bases the consumption is calculated along the route however, this question has the highest significance from the point of view of the accuracy of the estimation.

It is widely know that the actual capacity of a battery depends also on the ambient temperature, the previous number of charge-discharge cycles and often from the way and extent of the load. Accordingly, it often happens that in case of a well planned consumption for a given route where the capacity of the battery was considered as sufficient, the battery will get fully discharged before the target was reached, and the vehicle cannot proceed to the target or only with the use of excess human power.

In the publication WO2013/108246 a similar method is described, in which the expected consumption is determined not only at the beginning of the route but several times when the vehicle proceeds along the route when the measured consumption of the battery is taken also into account, and when the consumption estimated till the end of the route is smaller than the available capacity, then the driver of the vehicle is warned, he is navigated to a charge station or an alternative route is suggested.

This publication is also silent concerning the question on the basis of what data and in which way the expected energy consumption is determined till the end of the route.

There is an actual need to a method and a device which can provide not only the required navigation but on the basis of a more accurate estimation it can warn the driver of the vehicle in good time in advance that the available electrical energy will prove to be too few for reaching the target. In such a case it suggests an alternative route or a different solution to the driver, which (if such exists at all) enables reaching the target with a smaller energy consumption.

SUMMARY OF THE INVENTION

The object of the invention is to provide a method for electrically driven vehicles by which the described need can be satisfied.

For reaching this object a method has been provided for monitoring and navigating a vehicle with electric drive moving towards a predetermined target along a navigated route with an off-line navigation device, that comprises the steps of preparing a table that is related to the vehicle when moving with a predetermined speed and under a predetermined load; storing the associated data in an electronic memory; storing in the memory as a basic information the consumption of the vehicle when it takes a unity distance along a horizontal road with the predetermined speed; then storing corrected consumption values as a function of positive or negative angles of inclination of a road section of unity length that represents the ratio of experimentally determined consumption values of the vehicle at any given angle of inclination to the consumption along the horizontal road of unity length; storing map data of a map comprising said route in an electronic data storage unit, wherein these data also include altitude and/or steepness information; then following the starting of the vehicle monitoring and measuring in given time intervals the momentary storage capacity of the battery of the vehicle; dividing the remaining route leading to the target into a plurality of road sections so that each road section has a respective uniform angle of inclination, the meeting points of neighboring sections are referred to as knot points and the sections interconnecting the knot points are referred to as edges, and in case of each of said edges and based on said stored data determining respective weighted costs associated with said edge; summarizing said weighted costs to the remaining length of the route; and based on the resulting sum determining the expected consumption of the vehicle till reaching the target, and comparing the expected consumption with the measured available capacity of the battery, and if the expected consumption is higher than the available capacity of the battery, warning the driver of the vehicle.

It Is preferred if together with or instead of the warning alternative routes are searched by route re-planning technique between the momentary position of the vehicle and the target, for each alternative routes the expected consumption is calculated, and if there exists an alternative route along which the consumption of the vehicle is expected to be under the measured available capacity of the battery, this alternative route Is suggested to the driver and in case of an acceptance by the driver, the vehicle is navigated to the target.

In a further embodiment the vehicle is navigated to a charge station together with or instead of said warning in case if along one of the alternative routes that lead to the target there exists a charge station within the reach of the vehicle with the available capacity of the battery.

It is also preferred if in the vehicle the ratio of machine and human contributions to the drive can be adjusted, then together with or instead of the warning such a ratio of the human and electric drives is either suggested to the driver or automatically adjusted, with which the available energy will be sufficient till reaching the target.

In a preferable embodiment the monitoring step is carried out in time intervals between 0.5 to 2 seconds.

By using the method according to the invention the reaching of the target can be guaranteed with a higher degree of accuracy that takes also into account a number of unexpected events, or the vehicle can be directed to a safer place.

BRIEF DESCRIPTION OF THE DRAWINGS

The invention will now be described in connection with preferable embodiments thereof, in which reference will be made to the accompanying drawings. In the drawing.

DETAILED DESCRIPTION OF THE INVENTION

With the method according to the invention in an electronic vehicle that proceeds towards a target along a navigated route, the actual available storage capacity of the battery and the actual energy consumption are both measured in regular sampling time intervals. The function of the consumption of the vehicle when proceeding with different average speeds along steep routes with different angles of inclination is known, finally the coordinate data of the planned route including the height data associated with these coordinates are also known along different segments of the route. In the knowledge of these data in case of each sampling event it is calculated and determined whether the actual storage capacity of the battery will be sufficient to reach the target. In case the result of such calculation confirms that the stored energy will be sufficient for the vehicle to reach the target, then both the sampling and the associated calculations will left unnoticed. If it is experienced that the available energy (capacity) is not sufficient to reach the target, appropriate measures will be taken. The most appropriate of such measures is the repeated planning of the previously planned route because in most of the cases the target can be reached along several routes, and the steepness and energy demand of different routes will also be different. If an alternative route is found that has a smaller energy demand and along which the vehicle can reach the target with the available capacity, then this will be signaled to the driver of the vehicle and suggest the choosing of this alternative route. After acceptance of this route the navigation will take place along this suggested route. A further option lies in that in case of electrically driven bicycles the warning to the driver will include that the ratio of the electric and human driving effort be changed or such a change is automatically adjusted, and when a smaller portion of energy is used, the target can be reached along the original route. These two measures can also be used in combination. A further possibility is to navigate the vehicle to a nearby charge station (if such exists within the allowable range).

If there is no actual way to reach the target according to these measures, then this is indicated to the driver who can perhaps change his target or can replace or recharge the battery.

Figure 1:
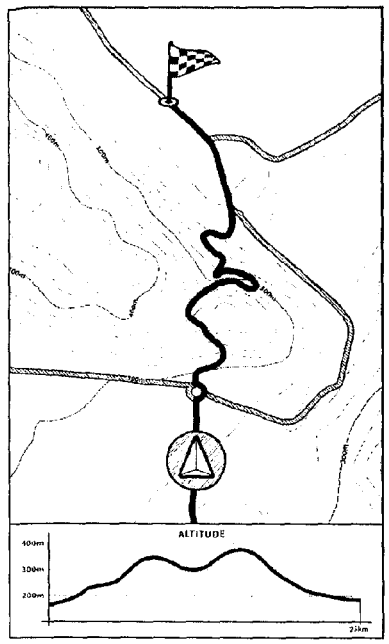
FIG. 1 shows the sketch of a planned navigation route.

Reference is made now to FIG. 1 that shows a map portion that shows the momentary position of the vehicle, the previously adjusted road and the target at the end of the road symbolized by a flag. The map also shows the altitude curves and other roads present in this map portion indicated by lighter lines. At the bottom of the map portion the altitude diagram of the road to be taken is shown.

In the method according to the invention samples are taken at predetermined intervals, e.g. in every minute. In such a sampling the available capacity of the battery is established as well as the momentary speed. Previously in a separate map memory the characteristic data of the given map (coordinates and altitude data) were stored. Further information including data concerning the load of the vehicle was also stored. Finally an electronic table was prepared in which it was stored when the vehicle takes a unity distance in case of roads with differing degrees of inclination how much will be the corresponding distance (with the same energy consumption) if the vehicle travels on a horizontal road. This number is referred to as a correction coefficient, and its value is higher than 1 when driving uphill. In the table the data of the correction coefficient are stored in steps of half degrees (in case of a given average speed). If the electric drive is prepared for energy regeneration, then in a downward slope the battery is charged, and the associated correction coefficient will be less than 1. For typical downward slopes the table also comprises these smaller than 1 coefficient values.

From these stored and actually measured data the energy consumption till reaching the target is determined in the following way.

In the map database the coordinate data of the roads are stored, and so called knot points are determined which are interpreted along the routes. Knots are the road points at which one of the parameters associated with the road is changed. Typically such a knot point is obtained where the angle of inclination of the road gets changed. The method is carried out on the basis of the per se known Dijkstra algorithm that uses graphs. Here the end points of the graphs are constituted by the knots and its edges are formed by the road sections interconnecting the knots, and costs associated with the respective edges will be the weighted (corrected)

distance of the edges, more particularly the consumption associated with taking this corrected distance e.g. in ampere-hour units. During the method starting from the momentary position the respective costs associated with the edges along the route are calculated and the sum of these costs will define the consumption until the target is reached.

If the calculated consumption is less than the available measured capacity of the battery, there is nothing to do, but in the next sampling moment a similar calculation will be made.

Let us suppose that as a result of such a sampling and associated calculation it is determined that the energy required for taking the remaining route is higher than the capacity of the battery, then this means that the vehicle will not be able to take the road using only its electric drive.

Figure 2:
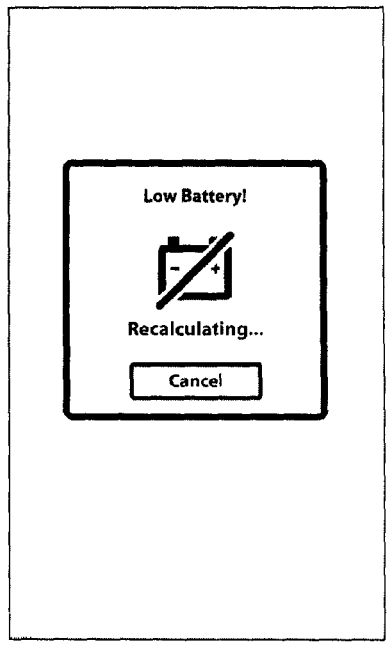
FIG. 2 shows the sketch of a screen that indicates a warning.

FIG. 2 shows an example for a display picture on the screen of the device, which can also be associated with an audible warning sound.

Figure 3:
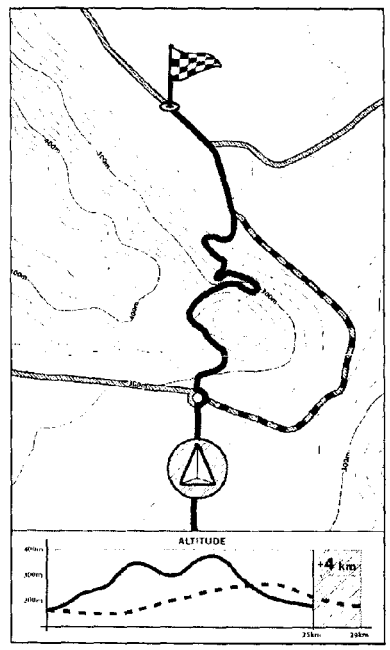
FIG. 3 shows a suggestion for a re-planned alternative route.
Figure 4:
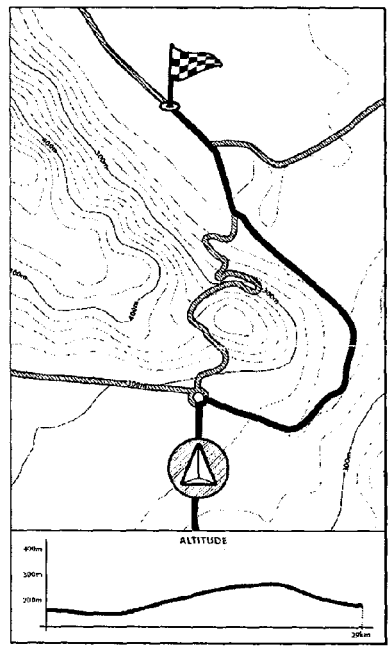
FIG. 4 show the view following acceptance of the suggestion of FIG. 3.

The system offers the possibility of a repeated route planning. The repeated planning can also be carried out in an automatic way, but even in such a case the driver should be warned on the changing of the route. In the repeated planning it is examined and determined if from the given position or from the neighbourhood thereof there is ((or are) another route that leads to the target. If such routes are found then the previously described calculations are carried out for each of them to learn the energy consumption by which the target can be reached along these routes. If there is a route along which the vehicle can reach the target with the available battery capacity, then this route will be suggested for the driver. In FIG. 3 a diverting road section is indicated by dashed lines that leads to the same target. If the driver accepts this suggested route then this route will be set as final and the navigation will lead along this route. In FIG. 4 the previously suggested route has become the navigated and displayed route illustrated by the heavy line. From the altitude curves indicated on the map portion it can also be established that along this suggested diverting route the level difference is smaller, thus the associated consumption is also smaller.

Of course, if there is no such an escape way or if it exists then the associated consumption still exceeds the available capacity, then this fact will be reported to the driver. In certain cases in the vehicle the proportion of the electric and human drive can be adjusted or if this adjustment can be carried out in an automatic way, then it is adjusted or indicated that under what percentage of the proportion the target can be reached either along the original or along a diverted route. If there is a charge station nearby, then this will be indicated to the driver who can decide whether he requires navigation there.

Figure 5:
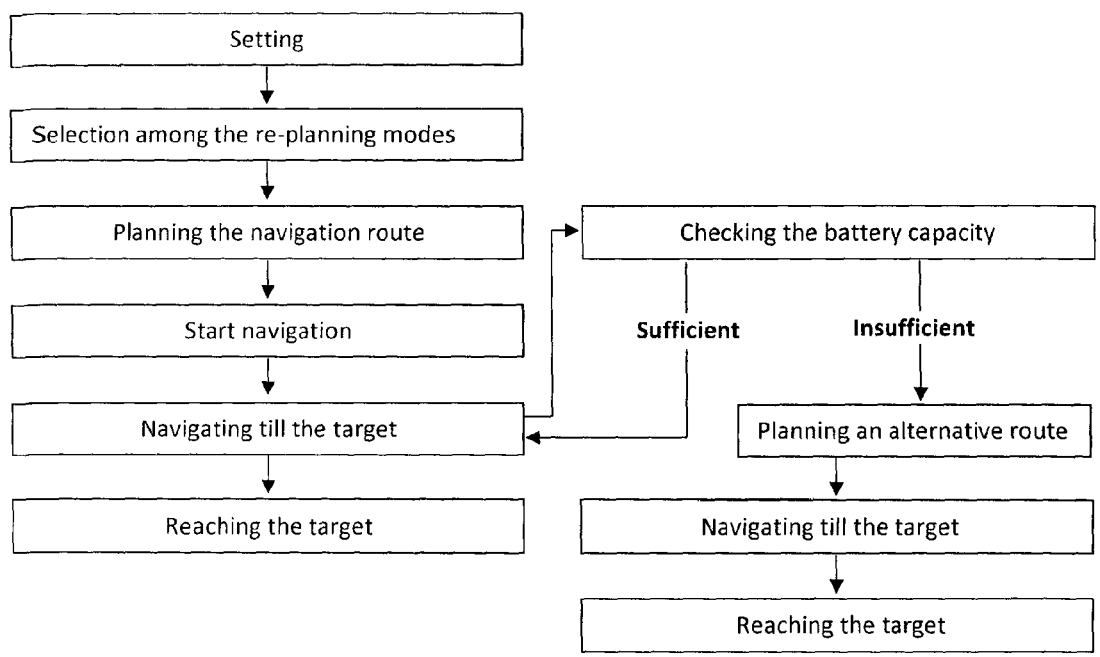
FIG. 5 shows the schematic flow chart of the method according to the invention.

FIG. 5 shows the flow chart of this method. As a first step the settings to the required navigation are made. At the first occasion the required electronic data and tables are stored i.e. the map data with the required altitude and route information and the consumption database (including the correction coefficients as a function of steepness) as well as constant data like the nominal capacity of the battery of the vehicle, the actual load and the average speed.

Then a choice between different re-planning modes is offered to the driver i.e. whether an previous approval is required for the re-planning or it can take place in an automatic way.

The planning of the navigation route takes place in a conventional way in which the driver enters the target point (or he can additionally define the preferred route) then the navigation will assist in reaching the target.

The sampling starts with the navigation, and in predetermined time intervals the previously described steps are carried out including the checking of the actual battery capacity, and based on the available stored data and route information the consumption required to reach the target is determined. The decision moment is dependent on whether the available battery capacity is sufficient to reach the target. If it is sufficient then the navigation along the originally planned route is continued, if it is not, then the driver can choose between the previously described alternatives, namely:

warning;
re-planning of the route;
navigation to a charging station;
automatic or suggested change of the ratio of the machine/human drive segments;
returning to the starting point.

With the method according to the invention the use of electrically driven vehicles will become safer because the greatest problem, namely the premature exhaustion of the battery and the associated inconveniences can be avoided.

Furthermore, the device that carries out the method is conveniently an off-line device that does not require any wireless connection to remote databases, i.e. the operation is not affected if the vehicle moves in areas where there is no mobile internet service.

The invention claimed is:

1. A method for navigating a vehicle with electric drive moving towards a predetermined target from a starting point with an off-line navigation device, the method comprising:
    preparing a table having data relating to the vehicle when moving with a predetermined speed and under a predetermined load;
    storing said associated data in an electronic memory;
    storing in the memory an energy consumption value of the vehicle when moving a unity distance along a horizontal road at the predetermined speed;
    storing a set of corrected consumption values as a function of positive or negative angles of inclination along a road section of said unity distance, the set of corrected consumption values represents the relationship of experimentally determined consumptions of the vehicle at any given angle of inclination to the energy consumption value along the horizontal road of said unity distance given said predetermined speed and said predetermined load;
    storing a set of map data comprising a plurality of possible routes along which said vehicle can move including altitude and/or steepness information;
    dividing each of said plurality of possible routes leading to the predetermined target into a plurality of road sections wherein each road section having a respective uniform angle of inclination, and wherein the meeting points of neighboring road sections are referred to as knot points and the road sections interconnecting the knot points are referred to as edges;
    determining a set of respective weighted costs representing consumption of the vehicle for each of said edges;
    summarizing said weighted costs for each of said plurality of possible routes, and selecting one of said plurality of possible routes having the smallest respective weighted cost of said plurality of possible routes and navigating the vehicle towards the target along said selected route;
    monitoring in given time intervals a momentary storage capacity of the vehicle, in each time interval repeating the calculation of said summarized cost from an actual route position to the predetermined target along said selected route; and based on the recalculated summarized cost, determining an expected consumption of the vehicle from the actual route position to the predetermined target, and comparing the expected consumption with the momentary storage capacity, and if the expected consumption is higher than the momentary storage capacity, warning the driver of the vehicle that the available capacity will be insufficient to reach the predetermined target and searching a plurality of alternative routes between the actual route position to the predetermined target, and calculating for each of said plurality of alternative routes the expected consumption, and if said expected consumption for one of said plurality of alternative routes is under the measured available capacity, suggesting said alternative route to the driver and in case of an acceptance by the driver, navigating the driver to the predetermined target along said alternative route.

2. The method of claim 1, wherein the vehicle is driven both by human and electrical energy and if the ratio of machine and human contribution to the drive can be adjusted in the vehicle, then together with or instead of said warning the ratio of the human and electric drives is either suggested to the driver or adjusted, with which the available energy will be sufficient until reaching the target.

3. The method of claim 1, wherein said monitoring step is carried out in time intervals between 0.5 to 2 seconds.

* * * * *